UNITED STATES PATENT OFFICE.

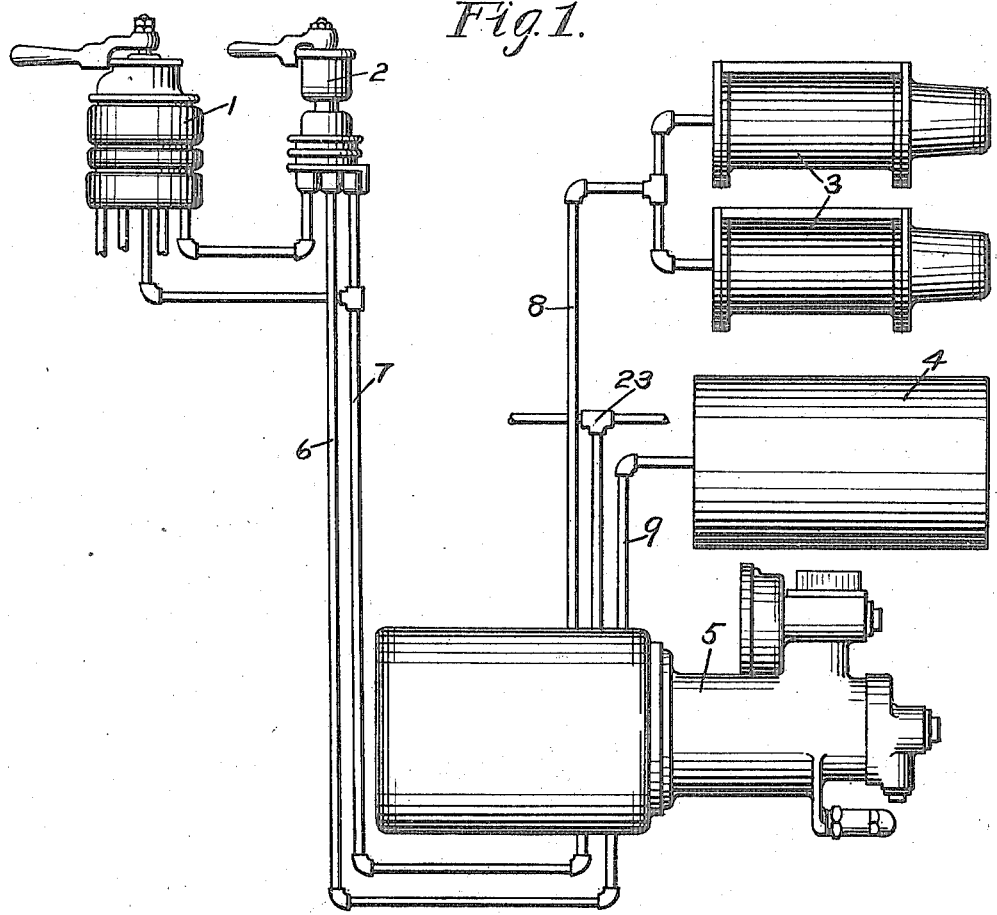

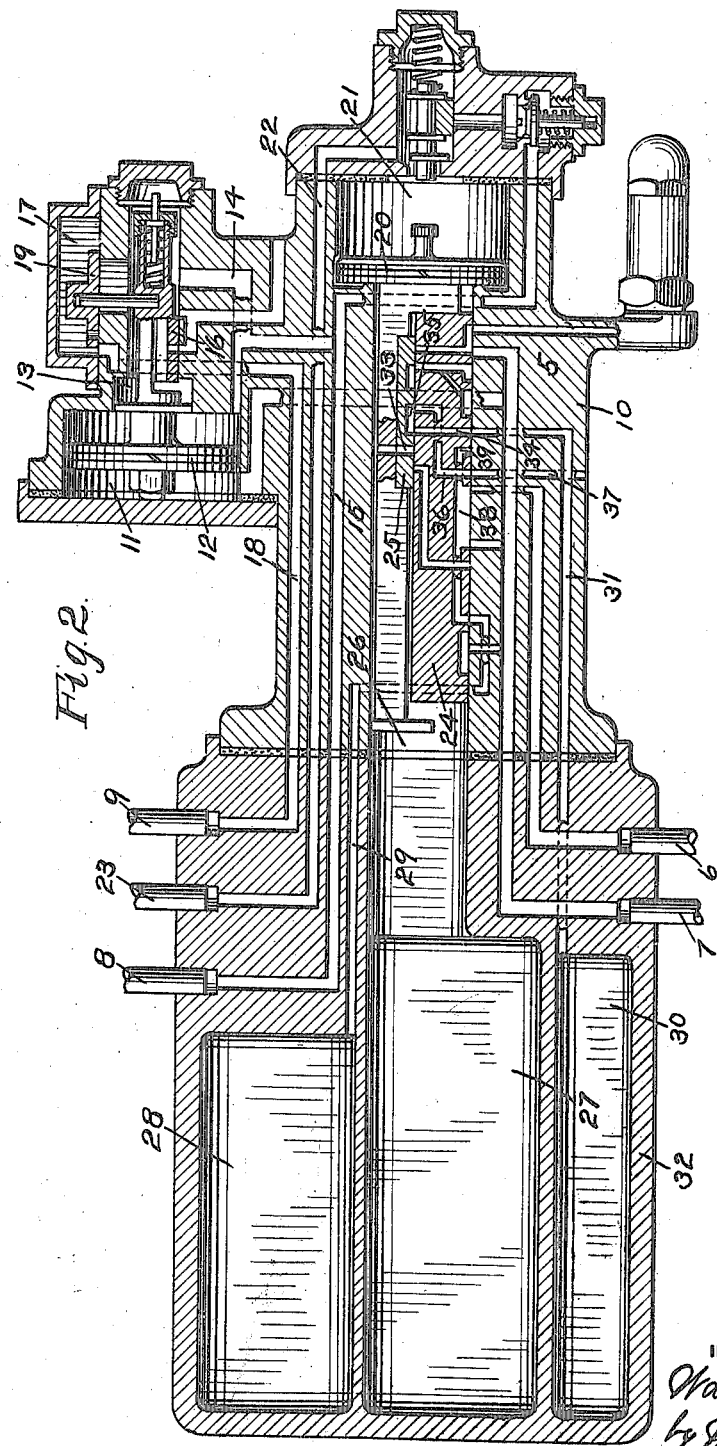

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,265,002. Specification of Letters Patent. Patented May 7, 1918.

Application filed December 31, 1915. Serial No. 69,621.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brakes, of which the following is a specification.

This invention relates to fluid pressure brakes, and is more particularly in the nature of an improvement on the construction shown in my prior Patent No. 1,142,860, dated June 15, 1915.

According to the construction covered by the above patent, an equalizing valve device is provided for controlling the application and release of the brakes on the locomotive through the operation of an application portion. This equalizing valve device is subject to the opposing pressures of the brake pipe and a pressure chamber and in addition to the above, a reduction reservoir is provided, into which fluid is vented from the pressure chamber upon initial movement of the equalizing piston to effect an application of the brakes. By this means, an application of the brakes on the locomotive is prevented, if the brake pipe reduction is less than a predetermined amount, dependent upon the equalizing point between the pressure chamber and the reduction reservoir, and if a greater brake pipe reduction is made, the brake application will be delayed on the locomotive, although not prevented.

The object of thus delaying or entirely preventing an application of the brakes on the locomotive is to prevent overheating and slipping of the tires by reason of the inherent tendency of the brakes to apply first on the locomotive.

According to the present improvement, while the action above referred to is retained, certain additional features are provided.

One feature consists in providing for the venting of fluid equalized from the pressure chamber into the reduction reservoir to the atmosphere after each reduction in brake pipe pressure, so that the desired result of preventing an application of the brakes on the locomotive will be prevented or delayed at each reduction in brake pipe pressure.

In addition to the above, if the brake pipe is overcharged or the feed valve operation is defective, a brake application will be prevented by the operation of the present improvement.

In the accompanying drawings, Figure 1 is a diagrammatic view of a locomotive fluid pressure brake equipment embodying my invention; and Fig. 2 a central sectional view of the improved distributing valve device.

As shown in Fig. 1 of the drawings, the locomotive brake equipment may comprise an automatic brake valve device 1, an independent brake valve 2, brake cylinders 3, main reservoir 4, and a distributing valve device 5. The independent brake valve has pipes 6 and 7 leading to the distributing valve device 5 and the brake cylinders 3 and the main reservoir 4 are also connected to said distributing valve device by the respective pipes 8 and 9.

The distributing valve device 5 may comprise a casing 10 having an application cylinder 11 containing application piston 12, a valve chamber 13, connected by passages 14 and 15 to the brake cylinder pipe 8 and containing release valve 16, and a valve chamber 17, open to the main reservoir 4 through passage 18 and pipe 9 and containing application valve 19.

The equalizing portion of the distributing valve device may comprise a piston 20 contained in piston chamber 21, connected by passage 22 to brake pipe 23 and a main slide valve 24 and a graduating slide valve 25 contained in valve chamber 26 which is open to pressure chamber 27.

An application chamber 28 is provided having a passage 29 leading to the seat of slide valve 24 and also a reduction reservoir 30, having a passage 31, leading to the seat of said slide valve.

As shown in the drawings, the application chamber 28, the pressure chamber 27, and the reduction reservoir 30 may be arranged in a separate section 32, adapted to be secured to the main casing 10.

The volume of the reduction reservoir 30 is proportioned so as to equalize with the pressure chamber at a predetermined reduction in brake pipe pressure, say five pounds, and in operation if the brake pipe pressure is reduced five pounds or less either by operation of the brake valve or accidentally through over-charging the brake pipe or through defective feed valve operation, then the initial movement of the equalizing piston and graduating valve 25 will cause port 33 therein to register with port 34 in the main valve 24, thus connecting the pressure chamber 27 with the reduction reservoir 30. In release position, the reduction reservoir is connected through passage 31, port 34, cavity 35 in the graduating valve 25, and port 36 with an atmospheric exhaust port 37, so that said reservoir is normally at atmospheric pressure, and consequently when the pressure chamber is connected to the reduction reservoir, fluid equalizes from the pressure chamber into the reduction reservoir and this prevents movement of the equalizing piston to service application position and it follows that the brakes will not be applied on the locomotive. The brake pipe reduction being five pounds or less is not sufficient to overcome the reduction in pressure produced in the pressure chamber and consequently the equalizing piston will move back so as to again cause the graduating valve 25 to connect the reduction reservoir 30 with the atmosphere through the cavity 35. It wil lnow be seen that so long as the brake pipe reductions do not exceed five pounds or the predetermined reduction for which the reservoir volumes are proportioned to equalize at, there will be no brake application on the locomotive.

If the reduction in brake pipe exceeds five pounds or the predetermined limit, then the equalizing piston will move to service application position, although the movement will be delayed by the time it takes for the pressure chamber to equalize into the reduction reservoir and this allows time for the train brakes to be applied before the locomotive brakes take hold, thus preventing a running-in of the train slack which will often occur where the locomotive brakes are applied before the train brakes.

In order to still further insure the venting of fluid from the reduction reservoir preparatory to a second or successive application of the brakes, the reduction reservoir is connected in service application position with the atmosphere by means of cavity 38 in the main valve 24, which registers in service position with exhaust passage 37 and port extension 39, leading from said cavity, which registers with passage 31.

It will now be seen that with the above construction, any number of successive brake pipe reductions can be made at less than the predetermined degree either through the manipulation of the brake valve or unintentionally, without causing an application of the brakes on the locomotive, and on the other hand, when the brake pipe reduction exceeds the predetermined degree, the application of the brakes on the locomotive will be delayed.

Having now described my invention, what I claim as new and desire to secure by Letters Patent, is:

1. In a fluid pressure brake, the combination with a brake pipe, a pressure chamber, and a valve device subject to the opposing pressures of the brake pipe and pressure chamber for controlling the brakes, of a reduction reservoir and means operating upon the initial movement of said valve device to effect an application of the brakes for venting fluid from said pressure chamber to the reduction reservoir and for venting fluid from said reduction reservoir to the atmosphere upon a further movement of said valve device.

2. In a fluid pressure brake, the combination with a brake pipe, a pressure chamber, and a valve device subject to the opposing pressures of the brake pipe and pressure chamber for controlling the brakes, of a reduction reservoir and means adapted upon a reduction in brake pipe pressure for first venting fluid from the pressure chamber to the reduction reservoir and then from the reduction reservoir to the atmosphere.

3. In a fluid pressure brake, the combination with a brake pipe, a pressure chamber, and a valve device subject to the opposing pressures of the brake pipe and pressure chamber for controlling the brakes, of a reduction reservoir and means adapted upon a reduction in brake pipe pressure less than a predetermined degree for first venting fluid from the pressure chamber to the reduction reservoir and then from the reduction reservoir to the atmosphere.

4. In a fluid pressure brake, the combination with a brake pipe, a pressure chamber, and a valve device subject to the opposing pressures of the brake pipe and pressure chamber for controlling the brakes, of a reduction reservoir and ports controlled by said valve device and adapted upon movement of said valve device under a reduction in brake pipe pressure for initially venting fluid from said pressure chamber to the reduction reservoir and then from the reduction reservoir to the atmosphere.

5. In a fluid pressure brake, the combination with a brake pipe, a pressure chamber, a piston subject to the opposing pressures of the pressure chamber and the brake pipe, and a main valve and a graduating valve operated by said piston for controlling the brakes, of a reduction reservoir and ports controlled by said valves for connecting the reduction reservoir directly to the atmosphere in release position, to the pressure chamber upon initial movement of the graduating valve toward application position, and to the atmosphere in service application position.

In testimony whereof I have hereunto set my hand.

WALTER V. TURNER.